United States Patent
Knapp

(10) Patent No.: US 6,963,305 B2
(45) Date of Patent: Nov. 8, 2005

(54) ELECTROMAGNETIC COUPLER SYSTEM

(76) Inventor: Guenther Knapp, 7 Briarwood Ave., Peabody, MA (US) 01960

( * ) Notice: Subject to any disclaimer, the term of this patent is extended or adjusted under 35 U.S.C. 154(b) by 0 days.

(21) Appl. No.: 10/263,143

(22) Filed: Oct. 2, 2002

(65) Prior Publication Data

US 2004/0066326 A1 Apr. 8, 2004

(51) Int. Cl.7 .......................... H04B 7/00; H04B 5/00; H01P 7/00
(52) U.S. Cl. ..................... 342/367; 333/81 R; 333/230; 455/41.1
(58) Field of Search ............................... 342/350, 367; 333/81 R, 81 A, 230; 455/41.1, 41.2

(56) References Cited

U.S. PATENT DOCUMENTS

| | | | | |
|---|---|---|---|---|
| 4,654,880 A | * | 3/1987 | Sontag ........................ | 455/41.2 |
| 5,241,410 A | * | 8/1993 | Streck et al. ................ | 398/115 |
| 5,347,239 A | * | 9/1994 | Loehner et al. ............ | 333/81 R |
| 5,557,290 A | * | 9/1996 | Watanabe ..................... | 343/713 |
| 5,625,883 A | * | 4/1997 | Leyten et al. ............... | 455/41.1 |
| 5,878,331 A | * | 3/1999 | Yamamoto et al. ............ | 455/83 |
| 5,977,841 A | * | 11/1999 | Lee et al. ................... | 333/24 C |
| 6,822,946 B1 | * | 11/2004 | Wallace ....................... | 370/328 |

* cited by examiner

*Primary Examiner*—Gregory C. Issing

(57) ABSTRACT

This invention makes it possible to communicate through solid non-metallic walls or ceilings with low microwave power levels. RF beam forming couplers are driven by common networks.

For connection to a LAN segment at the other side of a wall or ceiling, transceiver 4 transmits data modulated microwave RF to coupler 6 through a directional step attenuator 10. The reduced signal is received by the coupler system at the other side with a power level low enough to eliminate wireless detection from the outside. However, the directional step attenuator on the receive side reduces the signal power only by an insignificant amount due to its low directional losses during receive signal flow. Each coupler's geometry is minimizing the radiation exposed material volume by RF field concentration, therefore, enabling transmission through thick concrete walls at microwave frequencies without compromising privacy. When used as wireless access point, coupler transmits through a floor to wireless devices below. The preferred embodiment operates in the 5-GHz ISM band.

8 Claims, 5 Drawing Sheets

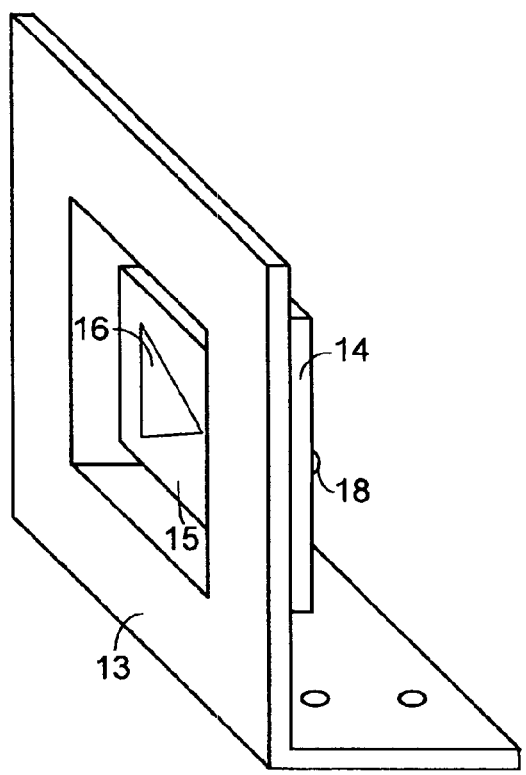 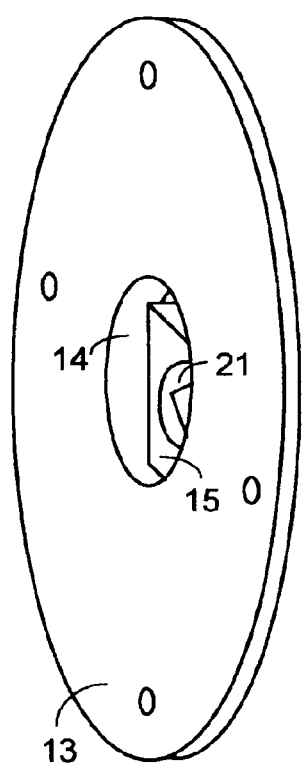
Fig. 4
Fig. 5

ELECTROMAGNETIC COUPLER SYSTEM

FIELD OF INVENTION

This invention is related to the field of communication where information is sent through non-metallic walls and ceilings by wired LANs (Local Area Networks) or wireless communication networks with signals strongly attenuated or blocked by thick walls and ceilings.

DESCRIPTION OF PRIOR ART

U.S. Pat. No. 5,218,356 issued to G. Knapp on Jun. 8, 1993 describes within a wireless network a device capable of transmitting data through a non-metallic wall or ceiling that otherwise would be blocked or unduly attenuated because of the high electromagnetic frequency employed in broadcasting or line-of-sight operation of a LAN. The described structure coupler has an independent transmission path for outbound data and an independent transmission path for inbound data.

Knapp's patent has on each side of a wall or ceiling one infrared (IR) transmitter, one IR receiver, one radio frequency (RF) transmitter, one RF receiver, and two RF antennas. In addition, there is a RF carrier detection system on each side.

The remaining problem is to provide information transfer also with bidirectional signal flow for accommodation of communication networks that do not have a ring, star or similar structure.

SUMMARY OF INVENTION

An electromagnetic coupler and system containing a single electromagnetic coupler on each side of a wall or ceiling structure solve the foregoing problem in the prior art. In addition, when a single electromagnetic coupler is placed on a floor or wall the system maintains, for a room below or for a room on it's opposite side, sufficient radio frequency (RF) power to connect to wireless devices for two-way communication in accordance to a network protocol.

Improvements simplify and optimize the operation of such couplers with regard to wall material, installation, privacy and low RF power requirement.

This and other unique aspects are presented in the following description and the accompanying drawings.

BRIEF DESCRIPTION OF THE DRAWINGS

FIGS. 4, 5, 6 and 7 are showing various configurations of the electromagnetic couplers.

DETAILED DESCRIPTION

Figure 1:
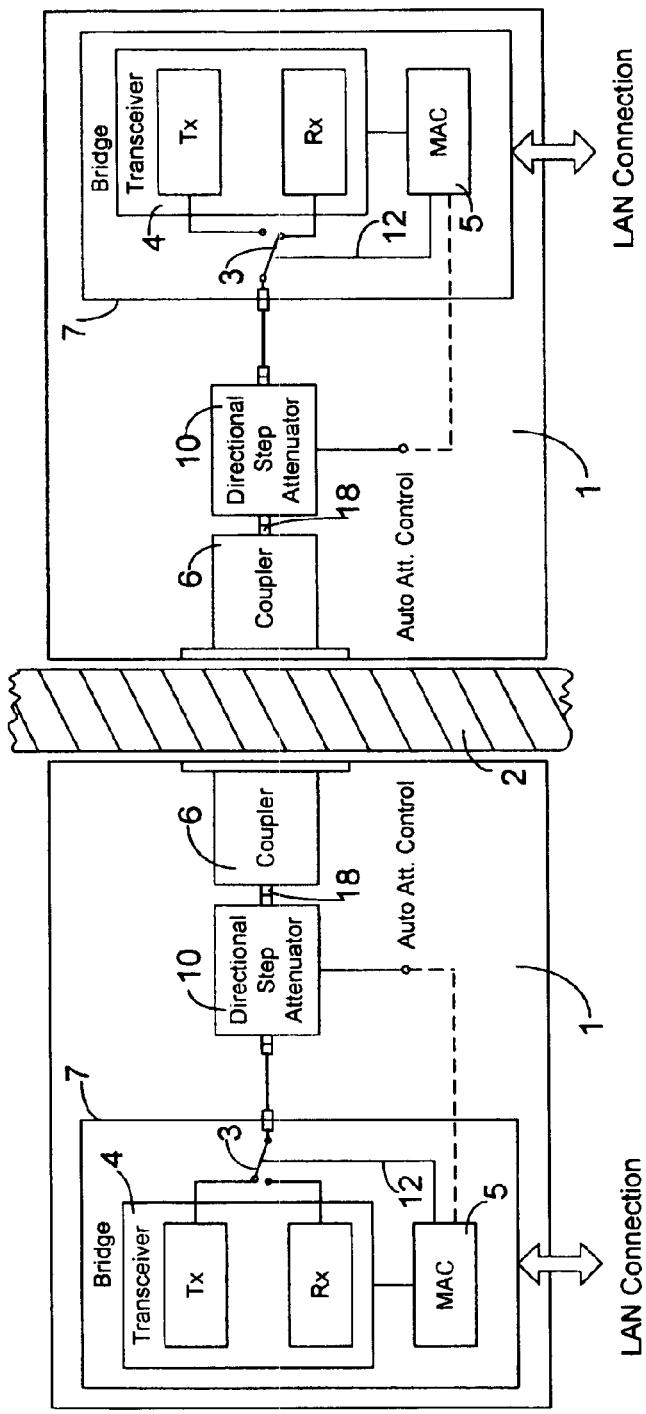
FIG. 1 is a block diagram of the electromagnetic coupler system providing connectivity to a wired LAN on both sides of a wall or ceiling.

In accordance with the present invention, system 1 communicates through a nonmetallic barrier such as a concrete wall or ceiling 2. The block diagram FIG. 1 depicts two electromagnetic wall coupler systems 1 for a wired LAN, operating with a protocol that requires bidirectional signal flow. The direction of signal flow for the transceiver 4 is set by Tx/Rx switch 3 with control line 12 in accordance to a communication protocol. For example, operation with an Ethernet's CSMA (Carrier-sense-multiple-access) protocol directing a MAC (media access control) system 5 when to transmit (Tx) and when to receive (Rx). Conventional MAC controlled transceivers for the purpose of wireless connection of two wired LAN segments are known as wireless bridges. In FIG. 1, two are depicted as bridge 7. Wireless bridge designs vary with the bridged media: wire/RF to RF/wire, fiber/RF to RF/fiber or RF/RF to RF/RF. They are all suitable for operating the bidirectional electromagnetic couplers 6 if the RF transmitter power can be adjusted to a level low enough to prevent unwanted detection from the outside but is high enough to overcome the structural losses of a wall or ceiling in maintaining reliable communication.

Commercial wireless bridges have RF output powers of not less than one milliwatt, that is too high for only microwatt power levels required for common concrete ceilings and walls in buildings. Insertion of resistive attenuators is not satisfactory because the receive (Rx) signal will be attenuated by an equal amount. Then, at microwatt power levels, an additional signal loss of 30 dB would occur for the receiver. The solution for this limitation is isolators designed to operate also in the reverse direction. In the preferred embodiment, FIG. 2, a single stage isolator 8 achieves about 20 dB attenuation (isolation) at microwave frequencies. An isolator's reverse (isolation) mode is the forward signal direction for Tx (transmit mode), while the isolator's normally forward mode, characterized with insertion losses, is used now for Rx, the reverse mode, with about 0.5 dB attenuation (insertion loss). Amplifiers can operate as bidirectional isolators 8 when gains are lower than their isolation characteristics. Unity gain amplifiers for example.

Figure 2:
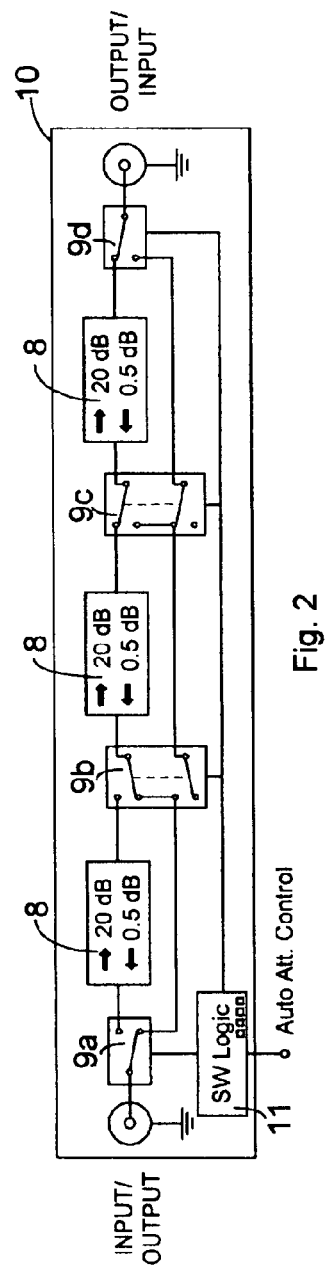
FIG. 2 is a directional step attenuator block diagram illustrating signal direction dependent attenuations.

By serial connection of such isolator means 8, built with or without switches, an optimum power selection for a specific wall or floor type and thickness is set manually by four selection keys, or by automatic attenuation control, see dashed line in FIG. 1. Such a bidirectional isolator means 8, we call directional attenuator 8, can be used in series for higher total attenuation and can be built with smaller attenuation steps or in analog form. FIG. 2 shows three arranged as a directional step attenuator 10 with switches 9a through 9b set to 40 dB total for Tx by SW Logic 11 for left to right signal flow and with 1 dB attenuation for Rx for right to left signal flow. A directional step attenuator 10 optimizes two-way transmission through a wall or ceiling and simplifies the system set up. It also makes it possible to use commercial transceiver systems with the said couplers 6. An alternate solution is the use of common RF attenuators switched in and out of the RF path with signals from the control line 12 in sync with the Tx/Rx position.

Wall couplers in LANs with ring configuration, often operated with a token-ring protocol, do not require directional attenuators because regular attenuators can be installed in each Tx transmission line of its coupler because Tx and Rx ports are separate.

Figure 3:
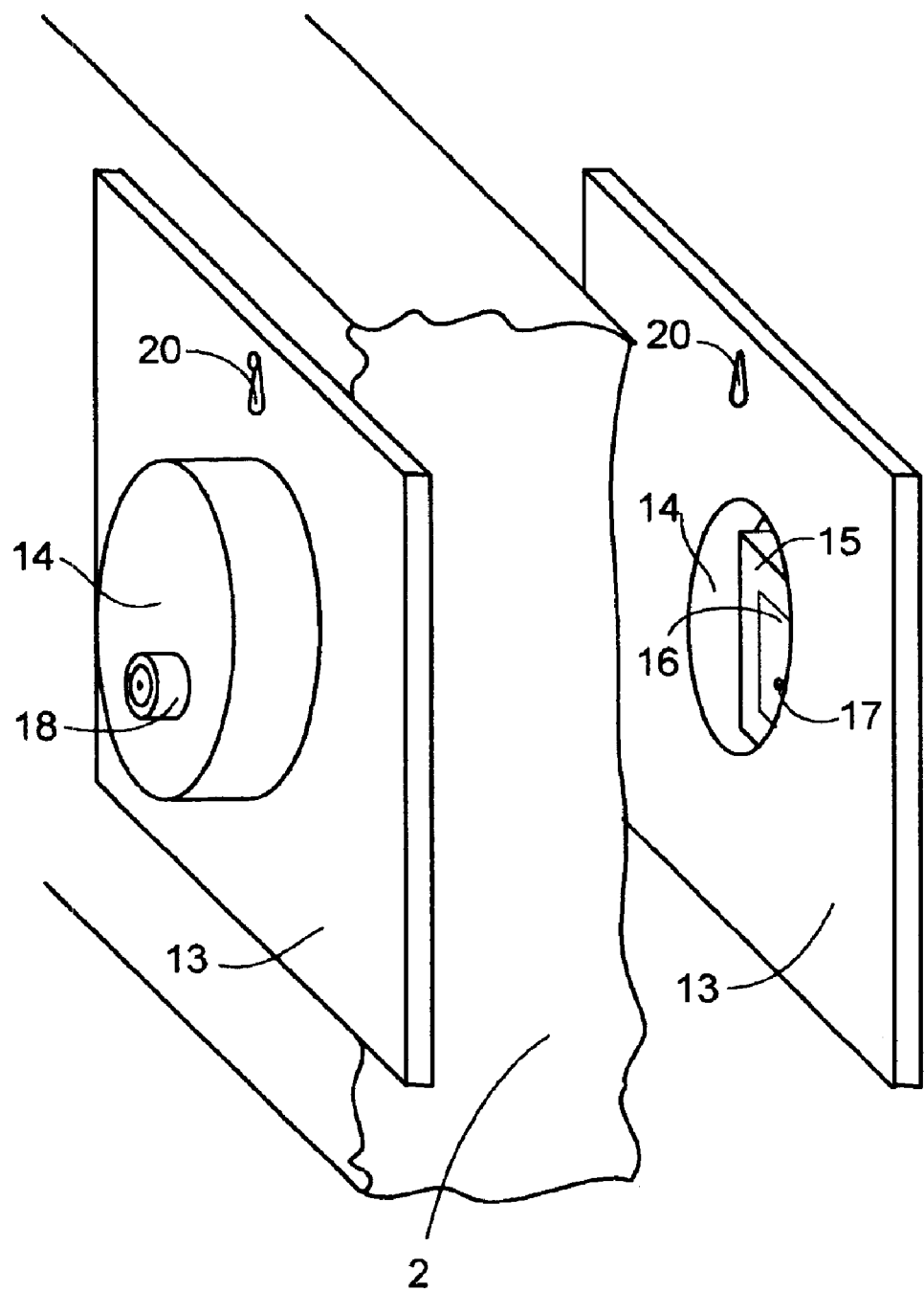
FIG. 3 shows the electromagnetic couplers in detail facing a wall.
Figure 6:
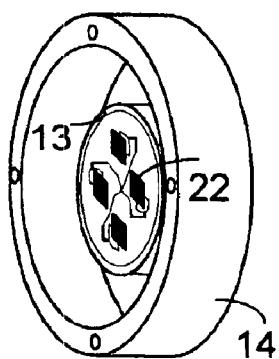

Two couplers are facing each other through a wall 2 in FIG. 3. A single coupler 6 has an electromagnetic reflective and conductive housing 14 with resonator 16 on a substrate with ground plane 15. A coaxial RF connector 18 is placed on the housing and is connected to a 50-Ohm tap on resonator 16 for connection to a transceiver (bridge) RF input/output connector. A conductive shield 13 provides additional RF grounding, shielding and coupling efficiency.

An identical companion coupler 6 is hanging on the other side of the wall by a fastening means 20. The said coupler is not flash mounted to the wall surface by a gasket. An approximately 2 mm parallel opening may exist between wall and coupler because walls and ceilings are not even. However, the escaping RF is insignificant. In addition, their placement is greatly simplified.

In the preferred embodiment resonator 16 is on an about 8 mm$^2$ copper clad patch on an approximately 3 mm substrate 15 with ground plane operating at 5.1 GHz. Patch designs are well known in the art. Important for an efficient and side lobe free coupler is the geometry of the reflecting housing 4, shield 13 and placement of patch 16 with substrate 15. In the preferred embodiment the following characteristics are implemented:

a) The aperture of housing opening is limited by a Brewster's angle for concrete to 60° at about 80 mm. (Brewster angle is the angle of radiation at which the electromagnetic wave is totally transmitted into the material).

b) The optimal distance of the radiating edges to the wall is dependent on the wave front phase, and is implemented with about ½ wavelength.

c) The larger the dimensions of the shield are, the higher the couplers' efficiency and its field confinement. Because of the small size of housing 14, shield 13 is about 2×3 wavelengths.

To protect the resonator 16 from dust and moisture the air volume is replaced by a low loss, low permitivity filler. Impedance matching location for the feed and signal input/output connector 18 is determined by near-field simulation of the complete coupler, FIG. 3. For a simple patch, a matching 50-Ohm impedance tap 17 is located near its center. Shielding means 13, a part of coupler FIG. 3, is placed close to the wall, parallel and opposite to an identical coupler 6 on the other side of the wall. Various coupler designs are shown in FIGS. 4, 5, 6 and 7. The coupler of FIG. 6 has a group of resonators 22 containing a multitude of patches that may be required to boost the coupler gain at higher microwave frequencies where high power losses in walls and ceilings are common. These patches can be phase aligned to optimize the field pattern. No shield is attached to this coupler to illustrate that a shield or gasket is not required if backward radiation and best coupling efficiency are not important.

Figure 7:
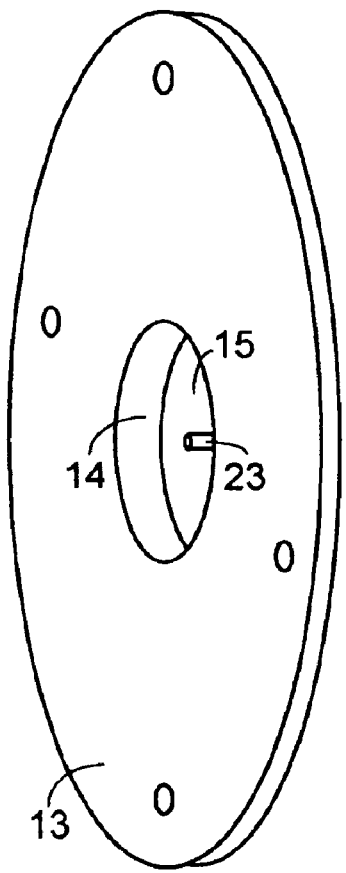

Not only patch resonators 16 are suitable for couplers. Simple microstrip dipoles, slots or in combination with patches 21 of couplers FIG. 5, are attractive since circular polarization orientation parallel to a wall or ceiling is maintained. FIG. 7 shows a coupler with an approximately one quarter wavelength dipole resonator 23. For a more compact design, the dipole 23 can be imbedded with a material of higher dielectric constant.

Couplers can be mounted in housings or frames, which are placed against a wall on a desk or shelf—not shown here—or simply to hang on the wall as an apparent picture with frame by its support hole 20. Coupler FIG. 4 can be used as a ceiling coupler by securing its bracket to the wall in a ceiling corner. On its opposite side, the floor side, the companion coupler can be easily placed at optimum reception with aid of a setup protocol or RF power metering device. Bridge 7 with directional step attenuator 10 and coupler 6 can be integrated in a common housing. An RF power indicator may be included with the coupler system as aid for an optimum location to the coupler on the opposite side of the wall or ceiling or added as a plug-in tool.

Figure 8:
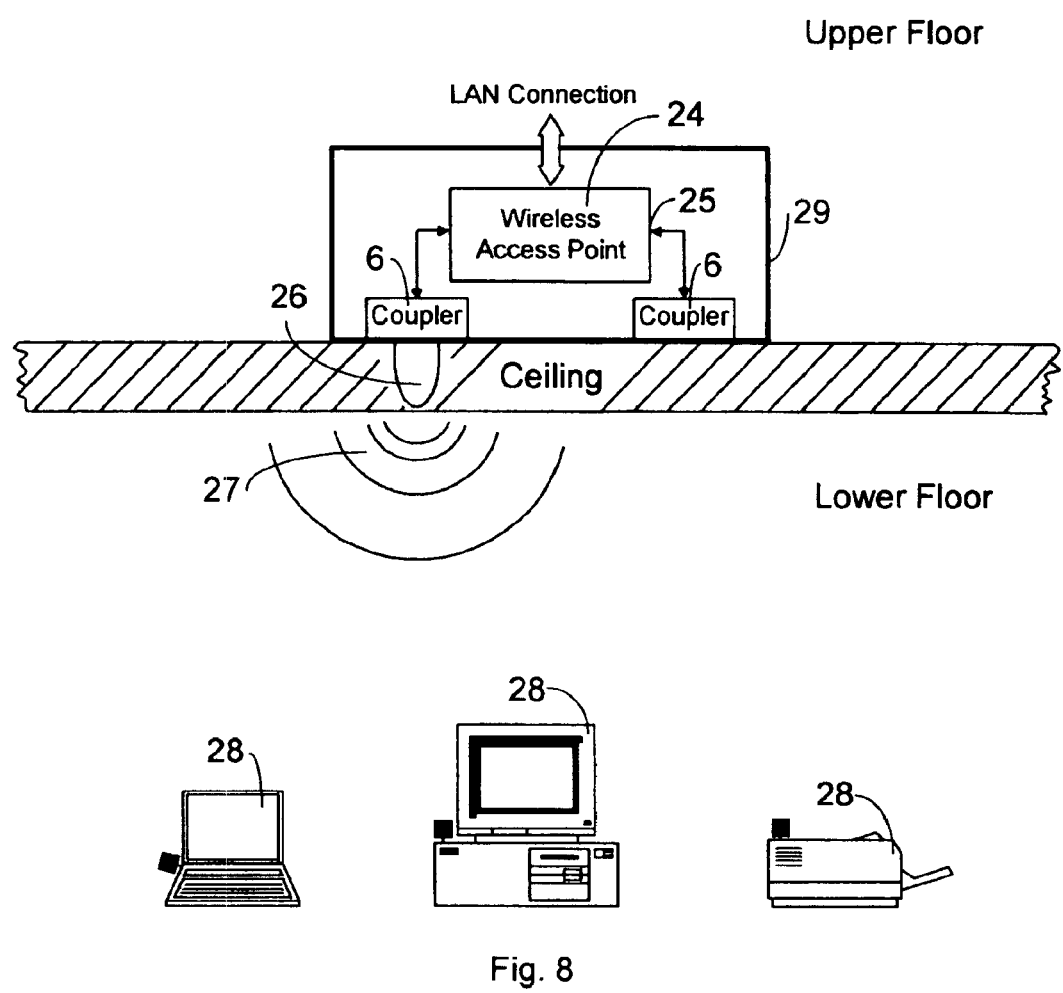
FIG. 8 illustrates the operation of a coupler behind a concrete ceiling for connectivity to wireless devices in the room below.

The high coupling efficiency through concrete and other materials permits the use of couplers as access points for a wireless LAN segment behind walls and ceilings. In temporary LANs, for example, couplers can be placed on the upper floor of a wired LAN, to communicate with wireless devices 28 (e.g. computers, telephones, machine controls, etc.). FIG. 8 is the block diagram of two couplers 6 connected to a wireless bridge access point 24 with an additional diversity antenna connection 25, integrated with housing 29, and communicating with devices, that are equipped with wireless LAN adopters, located in the room under the floor. In the cross section of ceiling 2, the concentrated RF field 26 is shown to illustrate its confinement, and with 27, the expansion of the radiation to a broad pattern at ceiling exit.

This very convenient and unusual application is due to the fact that the placement of the resonator inside a reflective housing with a chosen geometry and shield dimensions can minimize power losses by restricting the wall or ceiling penetrating RF radiation to a small as possible volume in the lossy material. By keeping the maximum exit angle of the RF beam in the material's Brewster angle, concentration of the RF field is optimum and backward radiation is reduced. Simple single patch type couplers, FIG. 3, are sufficient for concrete walls and ceilings of most buildings without exceeding the power limits of the ISM 2.4-GHz, 5-GHz and 24-GHz frequency bands.

It is to be understood that the above described embodiments are illustrative of the principles of the invention. Various other modifications and changes may be made by those skilled in the art which will embody the principles of the invention and fall within the spirit and scope thereof. For example, the foregoing illustrations for network operation with MACs in a centralized protocol dependent operation of the couplers do not cover the broader applications of this invention that do not need centralized protocol dependency. Such applications include relay functions with or without data restoration. This includes RF to RF coupler systems where also identical frequencies can be bridged as in certain repeaters. Basically, the invention is a microwave beam forming device with applications for pinpointing behind walls and illumination of areas by controlled beam widening.

What is claimed is:

1. An electromagnetic microwave coupler system for wired, fiber optic and wireless information networks to provide wireless communication through a wall or ceiling of various composition without its alteration, comprising:

a transceiver with data controller providing a bridging means for transmission and reception of information modulated microwave signals;

microwave coupling device of wavelength-related design for transmission and reception of said microwave signals through said wall or ceiling by using a radio frequency conductive and reflective housing structure with an aperture limited by a Brewster's angle creating a confined electromagnetic radiation field through said wall or ceiling in interaction with an antenna means placed within said structure and located close to said wall or ceiling; wherein, a RF conductive and reflective shielding means is part of said coupling device and is designed such that the said shielding means is surrounding the said aperture to prevent backward radiation of said radiation field while restricting the microwave signal penetration to as small as possible volume;

at least one means is provided to secure said microwave coupling device to said wall or ceiling;

a microwave signal attenuation means having bi-directional means with low forward signal power losses and high isolation attenuation is provided for control of transmitted said microwave signals to optimize power for a specific said wall or ceiling type and thickness;

said antenna means comprises at least one resonator used for both transmission and reception; and, at least one said microwave coupler system each with at least one said coupling device located above the ceiling or behind a wall of a building providing at least one wireless access point for communication through said wall or ceiling to communicate with wireless devices having their own antennas located below or behind said wall or ceiling; and, a second said microwave coupler system is placed at the opposite side of said wall or ceiling for communication with said first microwave coupling device for reception and transmission of said microwave signals through said wall or ceiling.

2. A microwave coupler system according to claim 1 wherein:

said antenna means is designed by approximation with a set of equations selected from prior art for various microwave antennas with their dielectric and metal structures to obtain the desired frequency, bandwidth and gain; and, said structure enclosing said antenna means with a one-sided opening for projecting microwave radiation outwards to penetrate said wall or ceiling with a minimum of reflected said microwave radiation from said wall or ceiling; and, a connecting means is with at least one impedance matching transmission path connected to said antenna means; and, said antenna means with said connecting means and said structure with and without said shielding means and said wall or ceiling are evaluated by electromagnetic simulation for correction of said approximation for optimizing the location of the said antenna means for proximity to said structure and said wall or ceiling for avoidance of capacitive effects and to optimize wave phases, whereby concentrating the said microwave radiation to a desired exit area with a desired propagation lobe within and external of said wall or ceiling to minimize microwave power losses for said microwave coupler system.

3. A microwave coupler system according to claim 2 wherein:

said RF conductive and reflective shielding means is combined with said structure having a minimum area of about one half-wavelength square whereby reducing RF power leakage by backward radiation and to increase the microwave coupling efficiency.

4. A microwave coupler system according to claim 3 wherein:

said means to secure said coupling device to said wall or ceiling is included by said shielding means in forming a mounting and standing support bracket whereby expediting installation of portable and temporary network setups.

5. A microwave coupler system according to claim 4 wherein said attenuation means, comprising:

at least one radio frequency isolator means with low forward power losses and high isolation attenuation using its predetermined isolation attenuation to reduce the power of said microwave signals in one direction of signal flow and using its lower forward attenuation for said microwave signals to flow in the opposite direction; and;

at least one attenuation means is connected serially into the path of said microwave signals between said bridging means and said coupling device whereby optimizing the received said microwave signals and minimizing the transmitted signal power for reduction of microwave power leakage by manual connection of the amount of said attenuation means required.

6. A microwave coupler according to claim 5 wherein said attenuation means comprising:

a switching engaged plurality of said attenuation means;

at least one said attenuation means with impedance matched ports for forward and backward signal flow; and, a plurality of low cross talk switching means providing impedance matched engaging of at least one said attenuation means whereby resulting in the directional step attenuator.

7. A microwave coupler system according to claim 4 wherein:

said directional step attenuator is placed into said microwave signals path of said bridging means and said coupling device whereby optimizing the received signal power and minimizing the transmitted signal power for wide ranges of wall or ceiling thickness and material types by manual switching or by automatic control signals from said bridging means.

8. A microwave coupler system according to claim 7 with said coupling device placed at said wall or ceiling wherein:

second said second microwave coupler system according to claim 7 is located at the opposite of said wall or ceiling with its coupling device placed against the opposite side of said wall or ceiling segment at the opposite side of said wall or ceiling whereby the closest location to said coupling device on the opposite side is determined by the received said microwave signals power maximum obtained during setup by the transceiver within said bridging means or by a RF power metering device.

* * * * *

UNITED STATES PATENT AND TRADEMARK OFFICE
CERTIFICATE OF CORRECTION

PATENT NO. : 6,963,305 B2
DATED : November 8, 2005
INVENTOR(S) : Guenther Knapp

It is certified that error appears in the above-identified patent and that said Letters Patent is hereby corrected as shown below:

Column 4,
Line 48, change "microwave coupling device" to -- a microwave coupling device --;

Column 6,
Line 12, change "and;" to -- and, --;
Line 41, change "second said second" to -- said second --;
Line 44, after "ceiling" cancel "segment at the";
Line 45, before "whereby" cancel "opposite side of said wall or ceiling".

Signed and Sealed this

Twenty-eighth Day of February, 2006

JON W. DUDAS
*Director of the United States Patent and Trademark Office*